(12) United States Patent  
Ren et al.

(10) Patent No.: US 11,704,893 B2
(45) Date of Patent: *Jul. 18, 2023

(54) SEGMENT ACTION DETECTION

(71) Applicant: Snap Inc., Santa Monica, CA (US)

(72) Inventors: Zhou Ren, Bellevue, WA (US); Yuncheng Li, Los Angeles, CA (US); Ning Xu, Irvine, CA (US); Enxu Yan, Los Altos, CA (US); Tan Yu, Singapore (SG)

(73) Assignee: Snap Inc., Santa Monica, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/465,001

(22) Filed: Sep. 2, 2021

(65) Prior Publication Data
US 2021/0407548 A1 Dec. 30, 2021

Related U.S. Application Data

(63) Continuation of application No. 16/228,120, filed on Dec. 20, 2018, now Pat. No. 11,158,351.

(51) Int. Cl.
*G06V 10/54* (2022.01)
*G06V 10/44* (2022.01)
(Continued)

(52) U.S. Cl.
CPC .......... *G06V 10/454* (2022.01); *G06V 10/764* (2022.01); *G06V 10/82* (2022.01);
(Continued)

(58) Field of Classification Search
None
See application file for complete search history.

(56) References Cited

U.S. PATENT DOCUMENTS 6,404,925 B1 6/2002 Foote et al.
9,811,718 B2 11/2017 Sun et al.
(Continued)

OTHER PUBLICATIONS

"U.S. Appl. No. 16/228,120, Advisory Action dated Nov. 23, 2020", 4 pgs.

(Continued)

*Primary Examiner* — Daniel T Tekle
(74) *Attorney, Agent, or Firm* — Schwegman Lundberg & Woessner, P.A.

(57) ABSTRACT

Aspects of the present disclosure involve a system comprising a storage medium storing a program and method for receiving a video comprising a plurality of video segments; selecting a target action sequence that includes a sequence of action phases; receiving features of each of the video segments; computing, based on the received features, for each of the plurality of video segments, a plurality of action phase confidence scores indicating a likelihood that a given video segment includes a given action phase of the sequence of action phases; identifying a set of consecutive video segments of the plurality of video segments that corresponds to the target action sequence, wherein video segments in the set of consecutive video segments are arranged according to the sequence of action phases; and generating a display of the video that includes the set of consecutive video segments and skips other video segments in the video.

20 Claims, 12 Drawing Sheets

(51) Int. Cl.
  G11B 27/10 (2006.01)
  H04N 9/87 (2006.01)
  G06V 20/40 (2022.01)
  G06V 10/764 (2022.01)
  G06V 10/82 (2022.01)

(52) U.S. Cl.
  CPC .............. G06V 20/41 (2022.01); G06V 20/46 (2022.01); G11B 27/102 (2013.01); H04N 9/87 (2013.01)

(56) References Cited

U.S. PATENT DOCUMENTS

| | | | |
|---|---|---|---|
| 11,158,351 | B1 | 10/2021 | Ren et al. |
| 2008/0273741 | A1 | 11/2008 | Fujii et al. |
| 2017/0337271 | A1* | 11/2017 | Lee ..................... G06K 9/6276 |

OTHER PUBLICATIONS

"U.S. Appl. No. 16/228,120, Final Office Action dated Mar. 16, 2021", 11 pgs.
"U.S. Appl. No. 16/228,120, Final Office Action dated Aug. 31, 2020", 9 pgs.
"U.S. Appl. No. 16/228,120, Non Final Office Action dated Feb. 27, 2020", 8 pgs.
"U.S. Appl. No. 16/228,120, Non Final Office Action dated Dec. 10, 2020", 9 pgs.
"U.S. Appl. No. 16/228,120, Notice of Allowance dated May 28, 2021", 8 pgs.
"U.S. Appl. No. 16/228,120, Response filed Mar. 8, 2021 to Non Final Office Action dated Dec. 10, 2020", 11 pgs.
"U.S. Appl. No. 16/228,120, Response filed Apr. 21, 2021 to Final Office Action dated Mar. 16, 2021", 12 pgs.
"U.S. Appl. No. 16/228,120, Response filed May 20, 2020 to Non Final Office Action dated Feb. 27, 2020", 11 pgs.
"U.S. Appl. No. 16/228,120, Response filed Oct. 30, 2020 to Final Office Action dated Aug. 31, 2020", 10 pgs.
"Surprise!", [Online] Retrieved from the Internet: <URL: https://www.snap.com/en-US/news/post/surprise>, (Oct. 3, 2013), 1 pg.
Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.
Carreira, Joao, "Quo Vadis, Action Recognition? A New Model and the Kinetics Dataset", arXiv:1705.07750v3, (Feb. 12, 2018), 10 pgs.
Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.
Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

* cited by examiner

US 11,704,893 B2

SEGMENT ACTION DETECTION

PRIORITY CLAIM

This application is a continuation of U.S. patent application Ser. No. 16/228,120, filed on Dec. 20, 2018, which is hereby incorporated by reference in its entirety.

TECHNICAL FIELD

The present disclosure relates generally to systems that identify interesting parts in a video.

BACKGROUND

People are usually interested in action instances occurring in short intervals of a video. Other portions of the video are usually viewed as background or irrelevant activities that are not interesting for a user to watch. In order to reduce the amount of time users spend searching for content, users increasingly rely on systems to automatically identify which portions of the content are of greatest interest.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
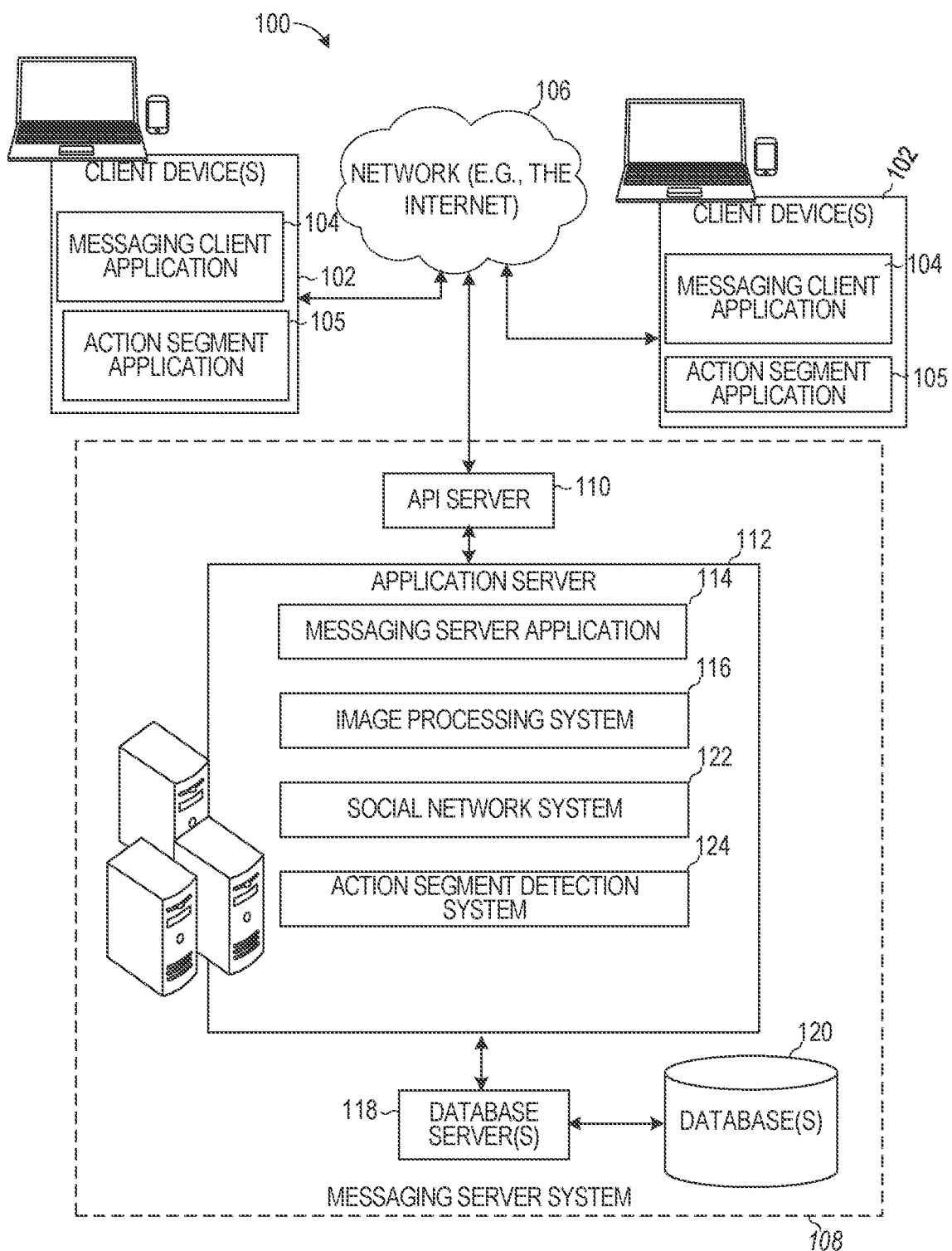
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Users increasingly rely on automated content identification systems. Conventional systems can accurately find entire programs or shows a user would be interested in watching and recommend such content. However, such systems are incapable of accurately identifying which segments within the programs or shows match a user interest level or contain action segments (e.g., portions in which a car chase is happening, goals get scored, a winner crosses the finish line, and so forth). Some systems can detect such action instances by scoring each video segment (e.g., a stack or collection of frames) individually. These approaches though end up either incorrectly marking segments as being action instances or producing an incoherent and inconsistent set of segments that represent snapshots of various action instances rather than a smooth clip that includes consecutive segments corresponding to the same action instance. This is because such systems fail to consider the temporal relations among the video segments (e.g., the systems fail to consider how one segment relates to another). This makes the systems unreliable and results in a poor overall user experience.

Certain other systems rely on pre-assigned (manually input) frame-level action labels to identify a set of frames corresponding to an action sequence. However, providing frame-level annotations and labeling is extremely slow, time consuming, expensive and complicated. This makes applying frame-level annotations and labeling to large-scale applications is impractical.

The disclosed embodiments improve the efficiency of using the electronic device by identifying a consecutive set of segments that correspond to the same action sequence that has been selected as a target action sequence (e.g., by a user). The disclosed embodiments identify the consecutive segments by exploiting the temporal relations among segments of a video (e.g., using a temporal structure mining network). The disclosed embodiments break up a particular action sequence into a set of action phases and model each action instance as a multi-phase process that characterizes phases evolving within an action instance. The disclosed embodiments use the identification of the consecutive set of segments to playback only the action segments of the video that have been identified and skip over other segments that do not correspond to the selected target action sequence (e.g., background segments).

According to some embodiments, phase filters (e.g., implemented using one or more machine learning techniques) calculate the confidence score of the presence of a selected action sequence's phase in each segment. The confidence scores are used to construct a table that represents the confidence score pertaining to each action phase for each segment. A maximum circulant path discovery process is applied to the table to identify the phase transition path through the table that results in the maximum overall confidence score. Namely, one of the confidence scores associated with a particular action phase is assigned and selected for each segment to result in the maximum overall confidence score. After the action phase is assigned and selected for each segment, the disclosed embodiments search through the table to identify a sequence of segments that correspond to a particular sequence of action phases (e.g., a first segment that corresponds to action phase 1, followed by a second segment that corresponds to action phase 2, and followed by a third segment that corresponds to action phase 3). This identified sequence of segments is the provided as the identified set of segments to playback as corresponding to a selected target action sequence.

FIG. 1 is a block diagram showing an example messaging system 100 for exchanging data (e.g., messages and associated content) over a network 106. The messaging system 100 includes multiple client devices 102, each of which hosts a number of applications including a messaging client application 104 and an action segment application 105. Each messaging client application 104 is communicatively coupled to other instances of the messaging client application 104, the action segment application 105, and a messaging server system 108 via a network 106 (e.g., the Internet).

Accordingly, each messaging client application 104 and action segment application 105 is able to communicate and exchange data with another messaging client application 104 and action segment application 105 and with the messaging server system 108 via the network 106. The data exchanged between messaging client applications 104, action segment application 105, and between a messaging client application 104 and the messaging server system 108, includes functions (e.g., commands to invoke functions) as well as payload data (e.g., text, audio, video, or other multimedia data).

Action segment application 105 is an application that includes a set of functions that allow the client device 102 to access action segment detection system 124. In some implementations, the action segment application 105 is a component or a feature that is part of the messaging client application 104. Action segment application 105 receives a user selection of a video and a target action class (e.g., action sequence). For example, the user can upload or select an action movie and specify (by selecting from various action classes) a car chase scene as the target action class. The selection can be received by the user uploading a movie (or media asset) to the action segment application 105 or providing a link to the movie to the action segment application 105. The action segment application 105 receives a user selection of a target action sequence by detecting a type of movie or media asset that the user selected and identifying a set of action sequences or classes that are associated with the media asset. In some embodiments, the media asset can include metadata identifying the action classes and the action segment application 105 utilizes the metadata to present the user a list of available action classes. The user selects one or more of the available action classes as the target action sequence or class.

The selection of the target action sequence indicates an instruction to the action segment application 105 to identify the set of consecutive segments from the received movie or media asset in which the selected target action sequence is present and to automatically playback only those identified set of consecutive segments. In this way, the user can watch only the portions of the selected movie or media asset that include content of interest to the user (e.g., the selected target action sequence). Specifically, the user can upload the movie and automatically be presented with only the car chase scene(s) featured in the movie or media asset.

The action segment application 105 applies various trained machine learning techniques to the movie or media asset to divide the movie or media asset into a set of segments and extract features associated with those segments. The features are provided to a set of phase filters to generate action phase confidence scores corresponding to various action phases of the selected target action sequence for each segment. These scores are then processed to identify the action phase transition path through the segments that results in the maximum score. This action phase transition path is processed to identify the set of consecutive segments that are arranged according to a predetermined sequence of phases of the target action sequence. The action segment application 105 can then playback the identified set of consecutive segments while skipping over other segments that are determined to correspond to background or a different action sequence. In some embodiments, the action segment application provides the identified set of consecutive segments to the messaging client application 104. Using the messaging client application 104, a user can communicate to another user device with another instance of the messaging client application 104 the identified set of consecutive segments corresponding to a target action sequence.

In some embodiments, the automatic identification of the target action sequence is triggered or performed in response to receiving a message from another messaging client application 104. For example, a user can receive a message from another user that identifies a given movie and specifies a target action sequence (e.g., the message may indicate "watch car chase scene in movie X"). The messaging client application 104 that receives this message can perform natural language processing to identify the media asset that is the subject of the message (e.g., "movie X") and the target action sequence (e.g., "car chase scene"). Based on this identification, the messaging client application 104 communicates with action segment application 105 to download or search for movie X and perform an action sequence identification process to find the car chase scene in movie X. Once this scene is identified, the messaging client application 104 presents the scene to the user (e.g., within the messaging client application 104 interface) as a clip or short video segment of the movie X.

In some embodiments, in order for action segment application 105 to identify the set of consecutive segments of the media asset corresponding to the target action sequence, the action segment application 105 obtains one or more trained machine learning techniques from the action segment detection system 124 and/or messaging server system 108. The processes for identifying the set of action segments within a given media asset or movie are described in more detail below in connection with FIGS. 7-9.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media (assets) files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the expression modification system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries or media assets). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the action segment detection system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends.

The application server 112 is communicatively coupled to a database server 118, which facilitates access to a database 120 in which is stored data associated with messages processed by the messaging server application 114.

Figure 2:
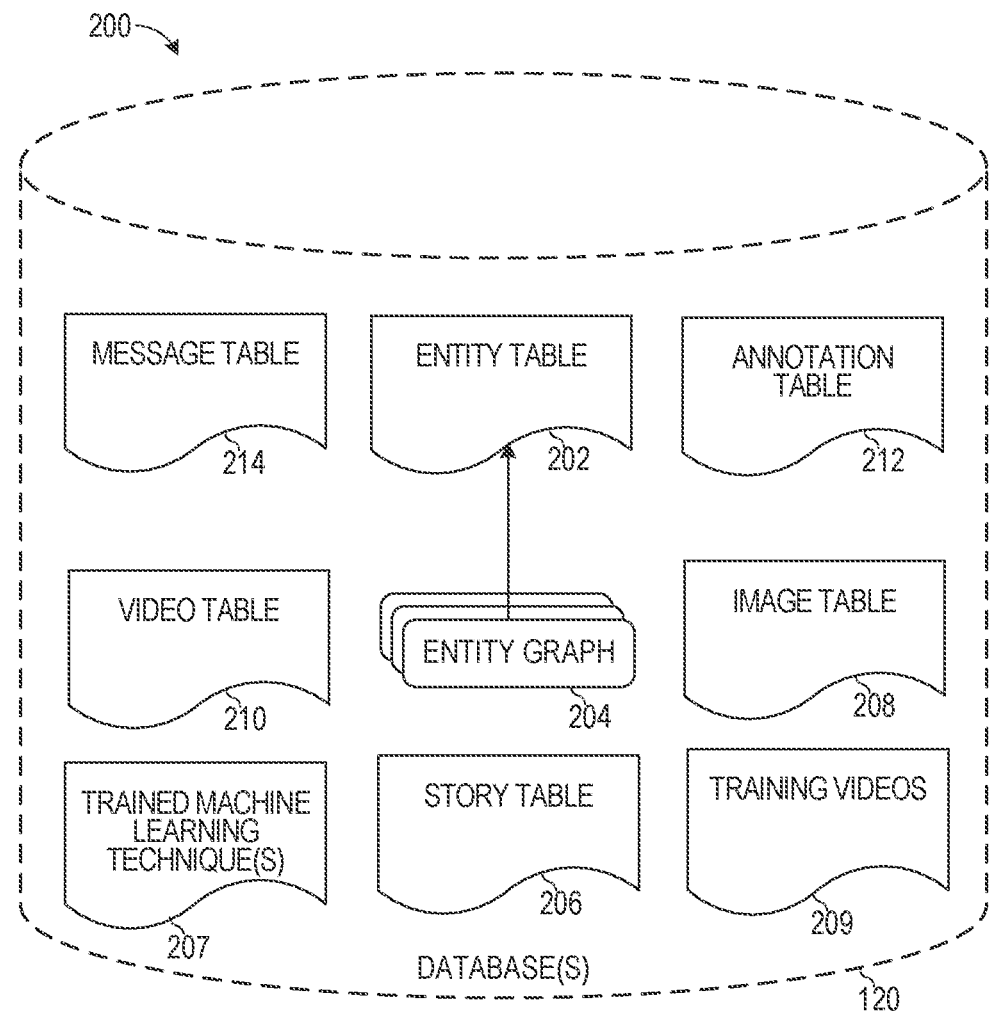
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Trained machine learning technique(s) 207 stores parameters (weights and coefficients) that have been trained for the machine learning techniques of the action segment detection system 124. For example, trained machine learning techniques 207 stores the trained parameters (W) of the machine learning techniques included in the segment generation module 412, segment feature extraction module 416, action phase filter module 418, loss computation module 440, and any other machine learning technique shown and described in connection with FIGS. 4-5.

Training videos 209 stores a plurality of training videos together with ground-truth action phase information or labels. Specifically, training videos 209 includes multiple videos of various action classes together with labels that identify the action phases featured or included in each segment of each training video 209. For example, training videos 209 include 10,024 videos associated with 200 activity classes. These videos include temporal boundary annotations and identifiers of each action phase in each video segment. The training videos are used to provide ground-truth information to train the machine learning techniques of action segment detection system 124.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
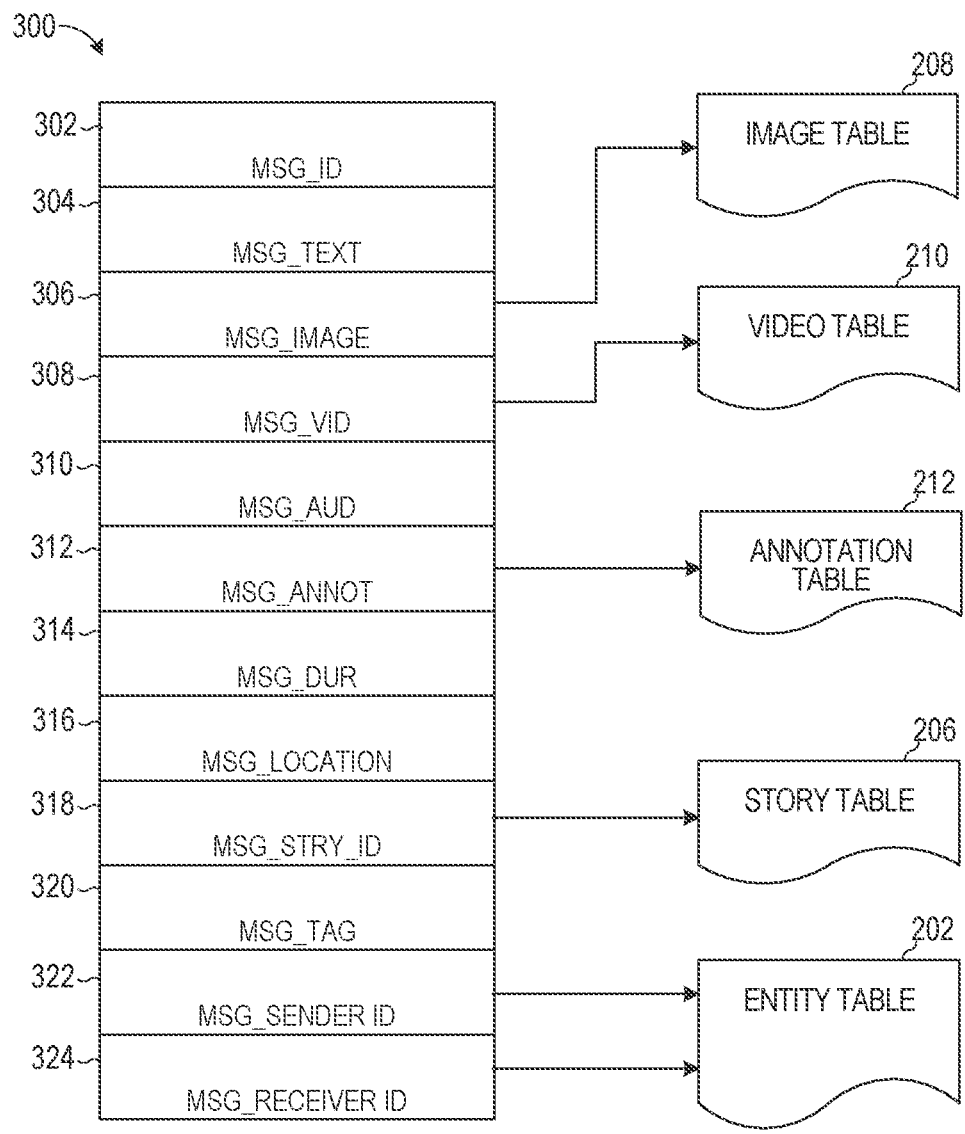
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

A message annotations 312: annotation data (e.g., filters, stickers (which may include synthetic images), or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
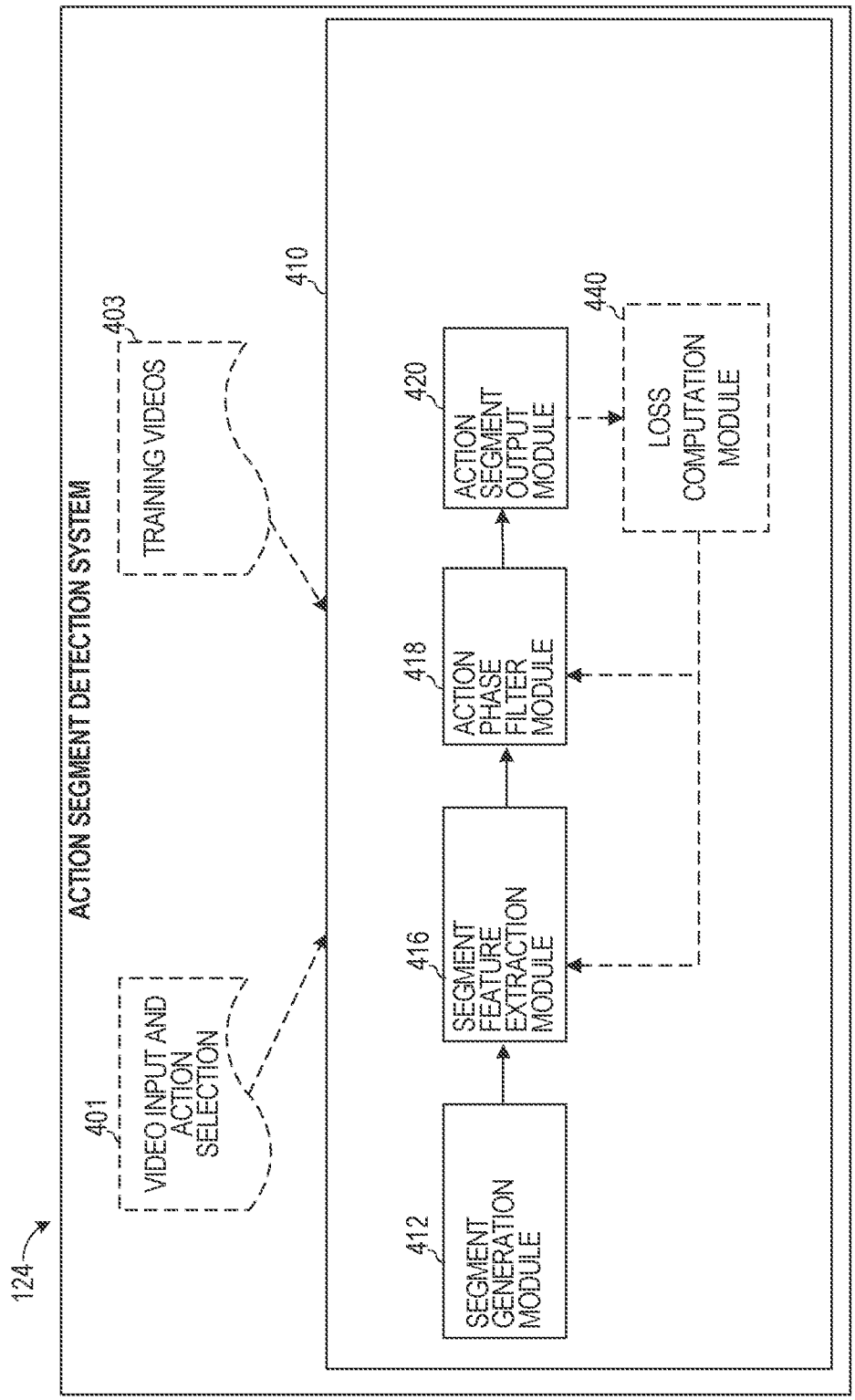
FIGS. 4 and 5 are block diagrams showing examples of an action segment detection system, according to example embodiments.

FIG. 4 is a block diagram showing an example action segment detection system 124, according to example embodiments. Action segment detection system 124 operates on input data 401/403 (e.g., a given video and a target action sequence that has been selected). The set of input data 401/403 can be obtained from training images 209 stored in database(s) 200 or from a client device 102 when an action segment application 105 is being used to identify an action sequence in a given media asset or movie selected by a user. Action segment detection system 124 includes segment generation module 412, segment feature extraction module 416, action phase filter module 418, action segment output module 420, and a loss computation module 440. In some implementations, the loss computation module 440 is only utilized and included when the action segment detection system 124 is being trained (e.g., when input data 403 including the training videos is being used with ground-truth information to train the segment feature extraction module 416 and action phase filter module 418). After these modules 416 and 418 are trained, the loss computation module 440 can be omitted. Each of the segment feature extraction module 416 and action phase filter module 418 implements one or more different machine learning techniques. The parameters of the machine learning techniques of action segment detection system 124 are stored as trained machine learning technique(s) 207 to be provided to a client device 102 implementing an action segment application 105.

The action segment detection system 124 initially is trained using training videos which contain ground truth information. After being trained on the training images, the action segment detection system 124 can be used on any given video and selected target action sequence to identify a set of consecutive segments in the given video that correspond to the selected target action sequence. Upon receiving a given video, the action segment detection system 124 provides the video to segment generation module 412. Segment generation module 412 divides the received video into multiple equally sized or unequally sized segments (e.g., divides the video into 30 second video segments). Specifically, segment generation module 412 uniformly decomposes the received video into N short video segments $[s_1, \ldots, s_N]$. In some embodiments, the received video is provided as short video segments and in such cases, segment generation module 412 can be omitted or skipped.

The segments generated by segment generation module 412 are provided to segment feature extraction module 416. Segment feature extraction module 416 is referred to as a backbone network. Segment feature extraction module 416 implements a machine learning technique (e.g., a convolutional neural network (CNN)). Segment feature extraction module 416 generates a set of features $x_i$ for each segment $s_i$ in accordance with the function $x_i = g(s_i, W)$, where W represents parameters of the machine learning technique implemented by segment feature extraction module 416.

Generally, CNN is a type of feed-forward artificial neural network where the individual neurons are tiled in such a way that they respond to overlapping regions in the visual field. CNNs consist of multiple layers of small neuron collections, which look at small portions of the input image, called receptive fields. The results of these collections are then tiled so that they overlap to obtain a better representation of the original image; this is repeated for every such layer. Convolutional networks may include local or global pooling layers, which combine the outputs of neuron clusters. They also consist of various combinations of convolutional layers and fully connected layers, with pointwise nonlinearity applied at the end of or after each layer. To avoid the situation that there exist billions of parameters if all layers are fully connected, the idea of using a convolution operation on small regions, has been introduced. One major advantage of convolutional networks is the use of shared weight in convolutional layers, which means that the same filter (weights bank) is used for each pixel in the layer; this both reduces required memory size and improves performance.

SVMs are supervised learning models with associated learning algorithms that are configured to recognize patterns. Given a set of training examples, with each marked as belonging to one of two categories, an SVM training algorithm builds a model that assigns new examples into one category or the other, making it a non-probabilistic binary linear classifier. An SVM model is a representation of the examples as points in space, mapped so that the examples of the separate categories are divided by a clear gap that is as wide as possible. New examples are then mapped into that same space and predicted to belong to a category based on which side of the gap they fall on.

Figure 5:
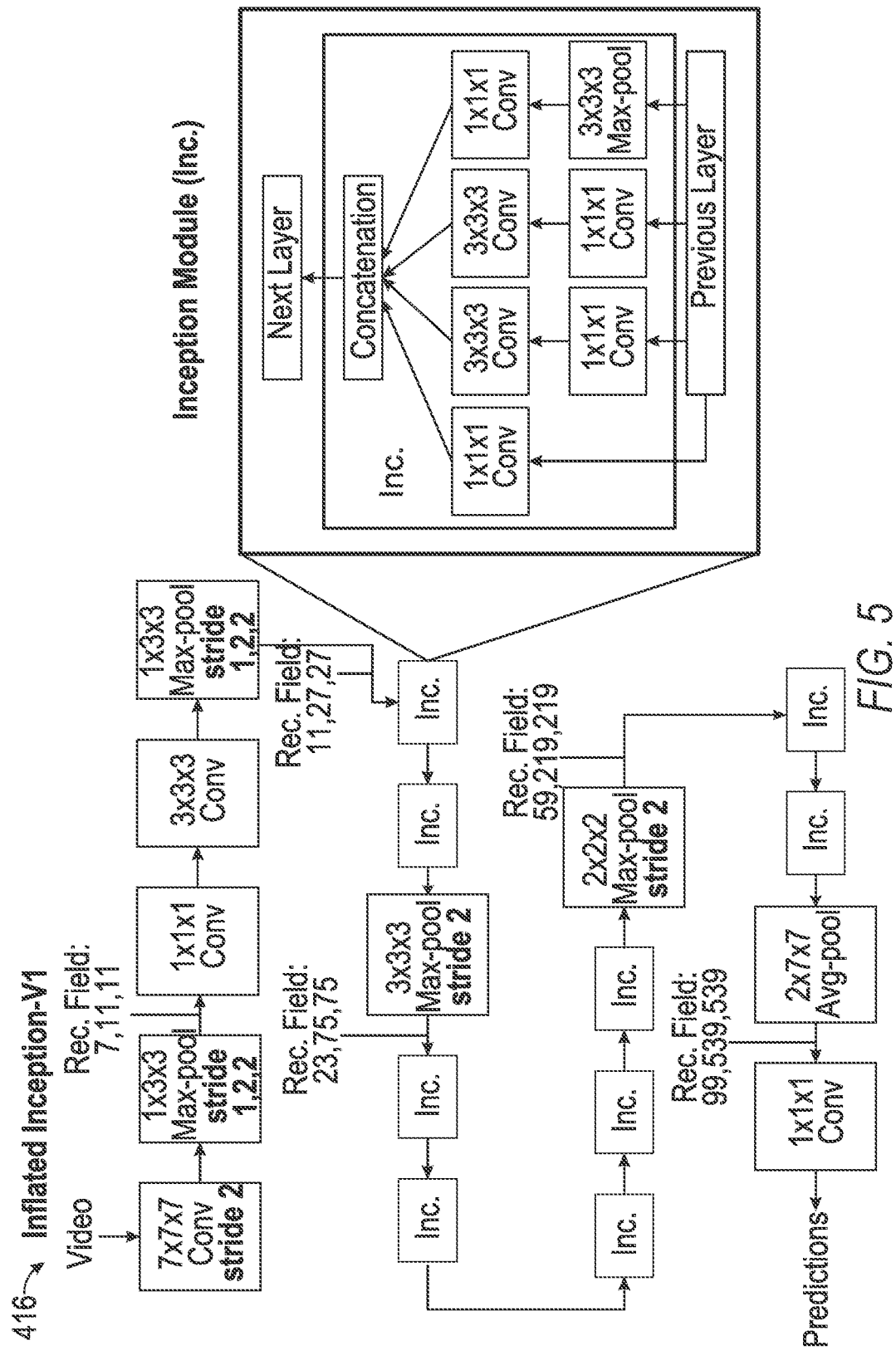

FIG. 5 illustrates a block diagram of an example implementation of the segment feature extraction module 416 including an I3D network. In the Inception-v1, the first convolutional layer has stride 2, then there are four max-pooling layers with stride 2 and a 7×7 average-pooling layer preceding the last linear classification layer besides the max-pooling layers in parallel Inception branches. The I3D network is based on a 2D ConvNet inflation. Further details of the I3D network and ConvNets are discussed in Joao Carriera et al., "Quo Vadis, Action Recognition? A New Model and the Kinetics Dataset," dated Feb. 12, 2018 and in Sun et al., U.S. Pat. No. 9,811,718, issued Nov. 7, 2017, which are incorporated by reference in their entireties.

As discussed below, each action class c is defined into M action phases $\{a_j\}^M$ and is modeled as an M-phase process. The background or non-action phases in the given video is modeled by phase $a_0$. The features $x_i$ extracted by the segment feature extraction module 416 are provided to the action phase filter module 418. The action phase filter module 418 processes the received features $x_i$ using a machine learning technique (e.g., a CNN) to compute a confidence score of the presence of phase a of class c in a segment $s_i$. In an embodiment, the action phase filter module 418 implements a plurality of phase filters each configured to identify a particular action phase of a given action class. For example, an action class may include three action phases. In such circumstances, the action phase filter module 418 implements three phase filters (each associated with a respective one of the three action phases of the action class) where each phase filter computes a likelihood or confidence score that the particular segment includes the action phase associated with the given phase filter. A segment that is determined to match or be associated with a confidence score that falls below a given threshold is determined to correspond to the background phase Phase0 and is assigned a score of 0.0.

In some implementations, each phase filter in the action phase filter module 418 computes the action phase confidence score for a given segment using the features provided by the segment feature extraction module 416 in accordance with Equation 1:

$$v_{c,i}^j = f(x_i, w_c^j, b_c^j) = x_i^T w_c^j + b_c^j, \quad (1)$$

where $v_{c,i}^j$ is the confidence score of the presence of phase $a_j$ of class c in a segment $s_i$, $f(\bullet, w_c^j, b_c^j)$, represents the j-th action phase filter for the class c, $x_i$ corresponds to features for segment i, and w and b correspond to parameters of the machine learning technique implemented by the phase filters.

Figure 6:
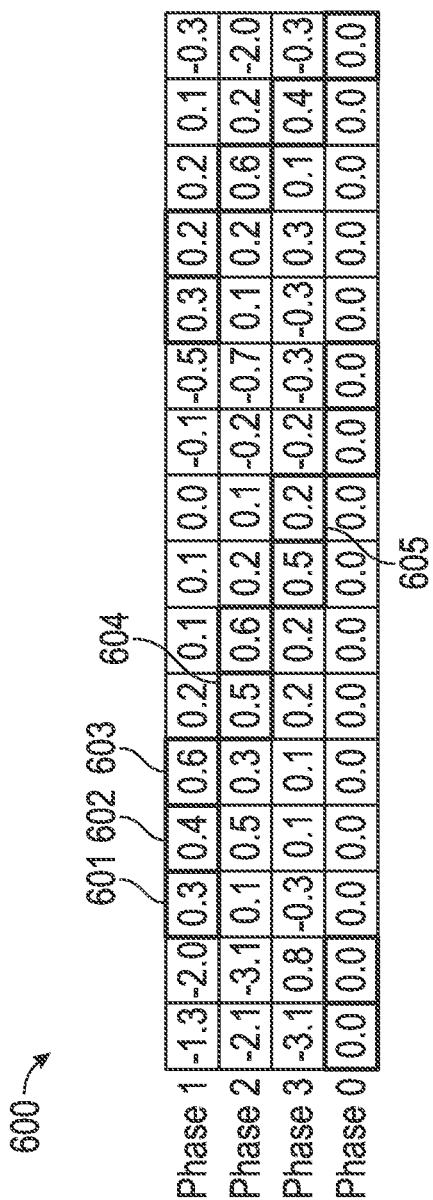
FIG. 6 is an illustrative output of an action phase filter module, according to example embodiments.

The action phase confidence scores computed by action phase filter module 418 are used to generate a confidence score table. FIG. 6 shows an illustrative confidence score table 600 generated by the action phase filter module 418 for a given video. In FIG. 6, $v_{c,i}^j$ is populated in the cell located in the j-th row and i-th column. Specifically each row in the table 600 represents a different action phase $p_j$ of a given action class and each column represents a different segment $s_i$.

Action phase filter module 418 provides the confidence score table 600 to action segment output module 420. Action segment output module 420 processes the action phase confidence scores in table 600 to identify a path in the confidence score table that corresponds to the maximum overall sum of the action phase confidence scores. Namely, action segment output module 420 selects one action phase from each segment in the table 600 to include in the path in accordance with process 900 to identify the path that results in the maximum overall sum of the confidence scores. As an example, the path highlighted in table 600 (e.g., the boxes surrounding each selected phase from a given segment in table 600) represents the phase transition path between segments corresponding to the maximum overall confidence score. This is referred to as the maximal circulant path and is represented by $\mathcal{P}_c = [p_1, \ldots, p_N]$ where each p identifies the selected phase for each segment i-N for a given class c.

The action segment output module 420 selects a given phase for a given segment in accordance with an action phase transition rule. Specifically, rather than selecting for each segment that phase with the highest confidence score, the action segment output module 420 uses a rule that limits the selection based on a phase selected for a previous segment. This ensure that the action sequence represented by consecutive segments is smooth as the segments that are selected for inclusion in the path have to follow a sequential action phase sequence. Namely, for a given segment $s_i$ in the phase $a_{pi}$, the phase of its next segment $s_{i+1}$ only has two choices: 1) remaining in the same phase as $s_i$ or 2) evolving to the next phase. For example, the action phase transition rule $a_{pi+1}$ for a given phase provides temporal structure modeling and is computed in accordance with Equation 2:

$$p_{i+1} \in \{(p_i+1) \% (M+1), p_i\} \quad (2)$$

The mod operation % means that the last phase $a_M$ evolves to the background phase $a_0$. In other words, the action phase transitions in a circular manner.

In an embodiment, given an untrimmed (unlabeled) video V, phase-wise confidence scores are computed for each segment $\{v_{c,i}^j\}_{j=1}^M$ in accordance with Equation 1 to construct the confidence score table 600. Given a path $P_c$ the path score $F_c(P_c)$ can be defined in accordance with Equation 3:

$$F_c(\mathcal{P}_c) = \sum_{i=1}^{N} \mathbb{1}(p_i \neq 0) v_{c,i}^{p_i}. \quad (3)$$

where $\mathbb{1}(p_i \neq 0)$ is the indicator function omitting segments in the background phase. Since the background's scores are never used when computing path score, by setting the background score to 0, an equivalent representation of Equation 3 is provided as Equation 4:

$$F_c(\mathcal{P}_c) = \sum_{i=1}^{N} v_{c,i}^{p_i}. \quad (4)$$

The action segment output module 420 formulates temporal structure mining into discovering a path constrained by Equation 2 with maximal path score computed in accordance with Equation 5:

$$\mathcal{P}_c^* = \operatorname*{argmax}_{\mathcal{P}_c} F_c(\mathcal{P}_c). \quad (5)$$

As discussed below in connection with FIG. 8, the loss computation module 440 is used to compute a loss of the maximal path relative to the ground-truth path. This loss is used to update the parameters of the machine learning techniques implemented by segment feature extraction module 416 and action phase filter module 418.

Figure 7:
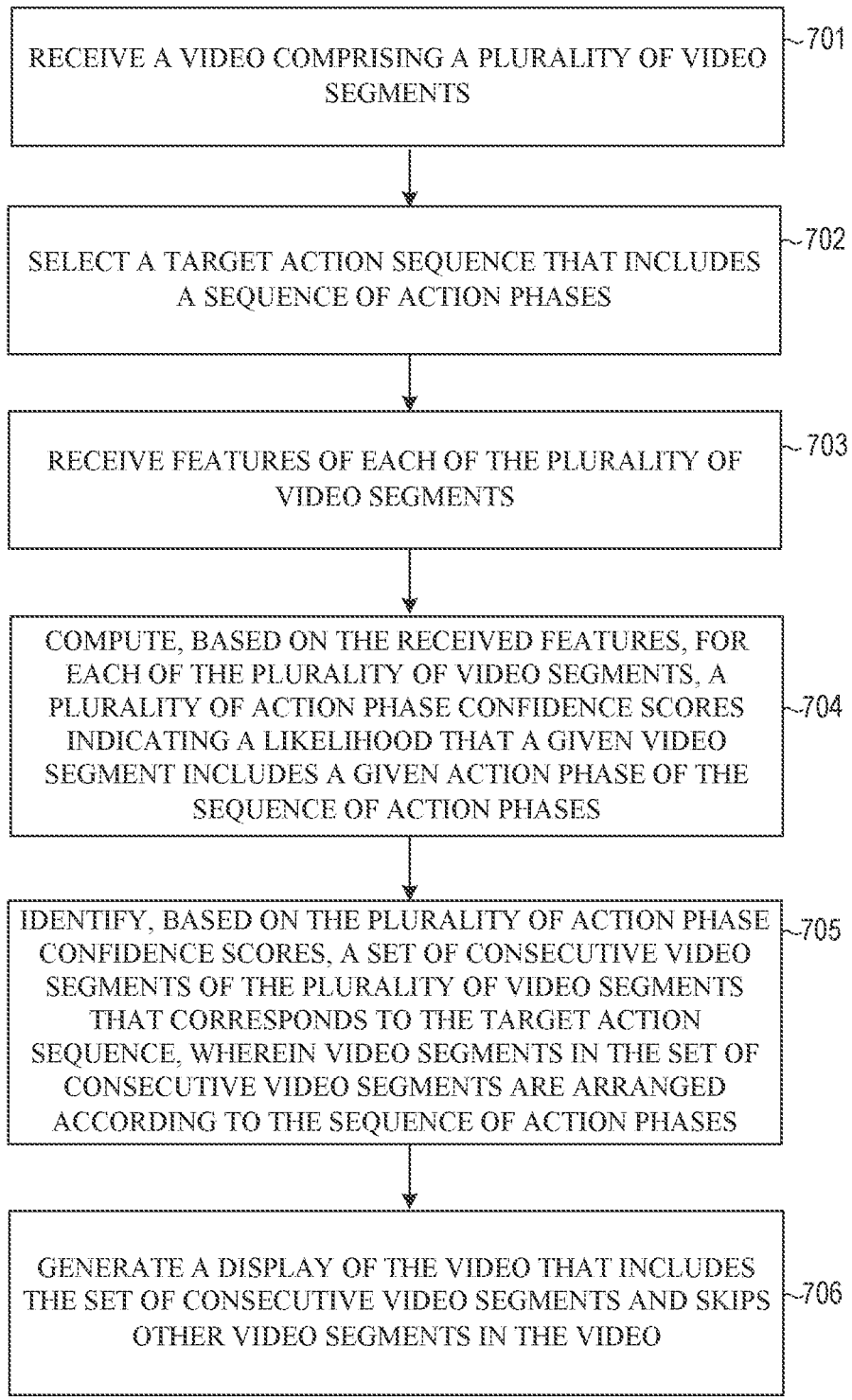
FIGS. 7-9 are flowcharts illustrating example operations of the action segment detection system, according to example embodiments.
Figure 8:
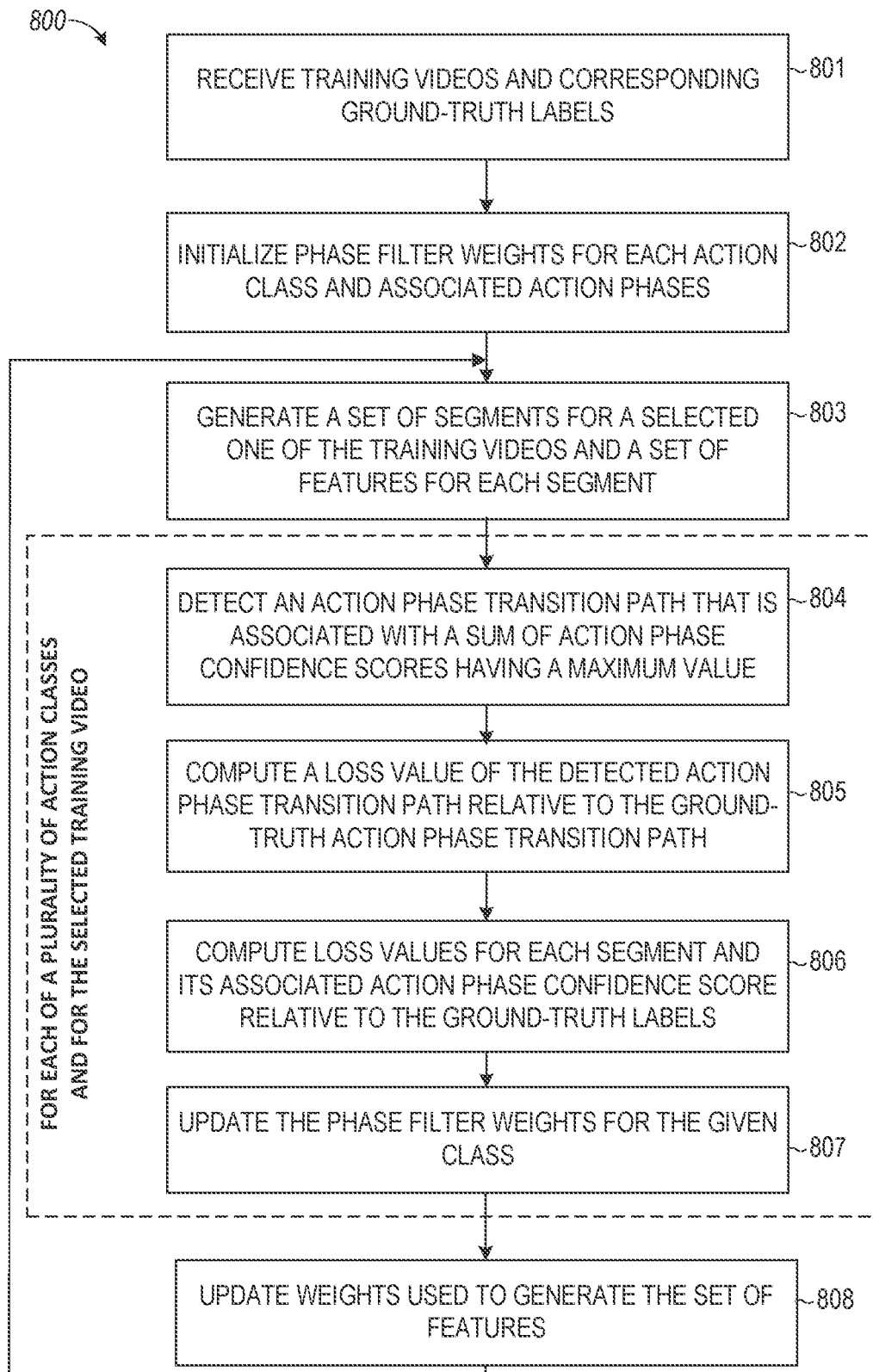
Figure 9:
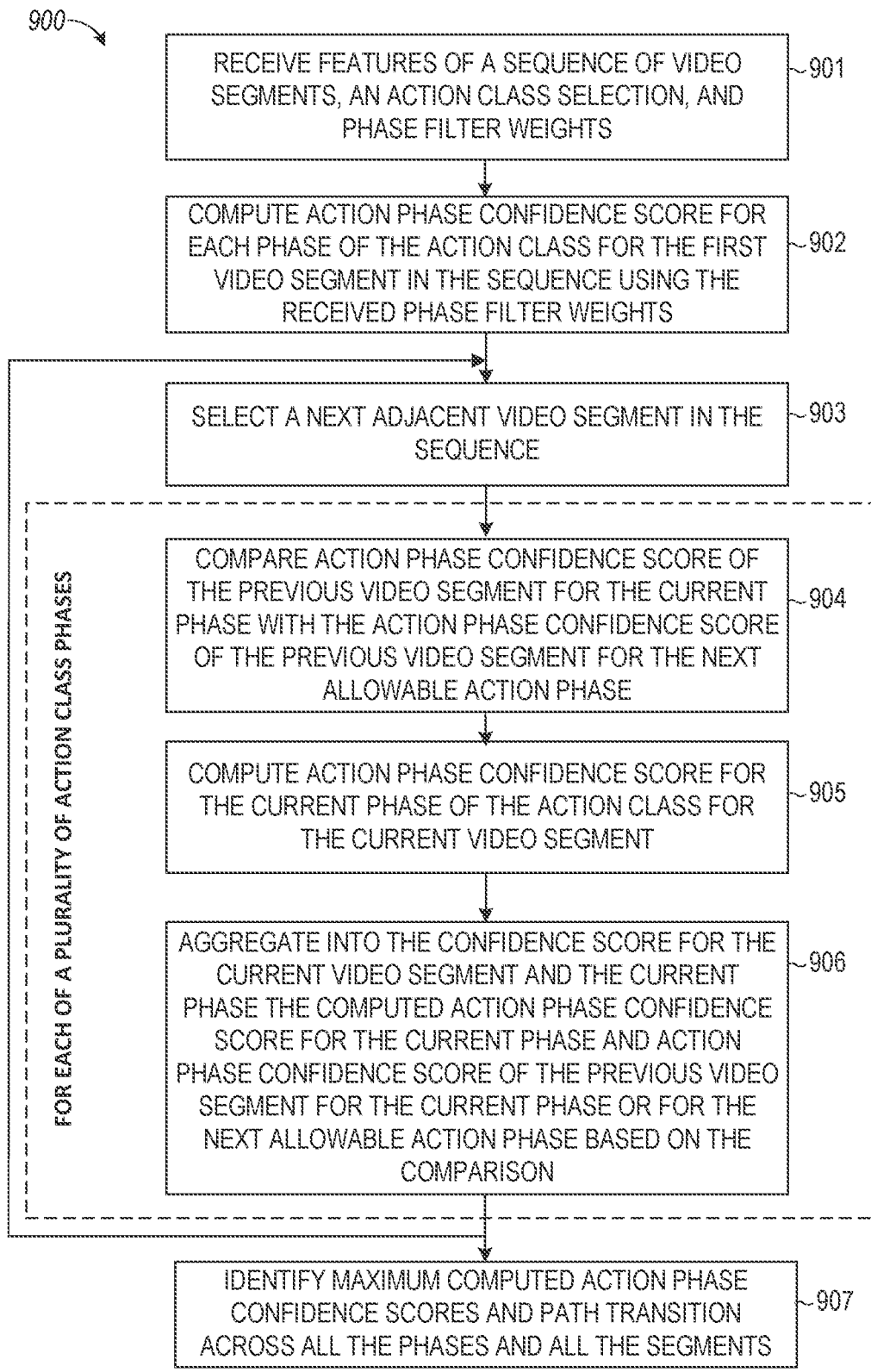

FIGS. 7-9 are flowcharts illustrating example operations of the action segment detection system 124 in performing processes 700-900, according to example embodiments. Specifically, process 700 describes the operations of identifying a set of consecutive video segments that correspond to a target action sequence after the machine learning techniques implemented by the messaging server system 108 have been trained. Process 800 describes the operations of training the machine learning techniques of messaging server system 108 to identify a target action segment.

The processes 700-900 may be embodied in computer-readable instructions for execution by one or more processors such that the operations of the processes 700-900 may be performed in part or in whole by the functional components of the messaging server system 108 and/or action segment application 105; accordingly, the processes 700-900 are described below by way of example with reference thereto. However, in other embodiments at least some of the operations of the processes 700-900 may be deployed on various other hardware configurations. The processes 700-900 are therefore not intended to be limited to the messaging server system 108 and can be implemented in whole, or in part, by any other component.

At operation 701, the action segment detection system 124 receives a video comprising a plurality of video segments. For example, a client device 102 receives a user input that uploads or identifies a given media asset or movie. This media asset or movie includes multiple segments and is provided by the client device 102 to the action segment detection system 124 via network 106.

At operation 702, the action segment detection system 124 selects a target action sequence that includes a sequence of action phases. For example, the client device 102 receives a user input that selects a given action sequence as a target action sequence. This selection may be made from a list of a plurality of available target action sequences. For example, the user can select that target action sequence of a car chase scene which is then provided by client device 102 to the action segment detection system 124 via network 106.

At operation 703, the action segment detection system 124 receives features of each of the plurality of video segments. For example, the action segment detection system 124 processes the received video using segment generation module 412 to divide the video into various uniform or non-uniform length segments. These segments are processed by segment feature extraction module 416 to extract one or more features $x_i$ for each segment.

At operation 704, the action segment detection system 124 computes, based on the received features, for each of the plurality of video segments, a plurality of action phase confidence scores indicating a likelihood that a given video segment includes a given action phase of the sequence of action phases. For example, the action phase filter module 418 computes the phase-wise confidence scores are computed for each segment $\{c_{c,i}^j\}_{j=1}^M$ in accordance with Equation 1 to construct the confidence score table 600.

At operation 705, the action segment detection system 124 identifies, based on the plurality of action phase confidence scores, a set of consecutive video segments of the plurality of video segments that corresponds to the target action sequence, wherein video segments in the set of consecutive video segments are arranged according to the sequence of action phases. For example, action segment output module 420 processes the action phase confidence scores in table 600 to identify a path in the confidence score table that corresponds to the maximum overall sum of the action phase confidence scores. In some embodiments, action segment output module 420 performs the operations of process 800 to identify the maximal path. The action segment output module 420 identifies a collection of consecutive segments using the path that correspond to a sequence of phases in the target action sequence.

For example, the target action sequence specifies that a target action sequence has the following sequence of phases: Phase 1, Phase 2, and Phase 3. Analyzing table 600, the action segment output module 420 searches for a segment along the maximal path that has been assigned the first phase of the target action sequence (e.g., Phase 1). In the example table 600, the action segment output module 420 identifies segment 601 as being the first video segment corresponding to the first action phase in the sequence. The action segment output module 420 then selects each consecutive segment 602, 603 along the path that follows the segment 601 along the path. Segments 602 and 603 still correspond to Phase 1 and are included in the path starting from the first segment 601 that corresponds to the first Phase 1. The action segment output module 420 then determines that segments 604 and 605 sequentially and consecutively follow segments 601-603 along the path and correspond sequentially respectively to Phases 2 and 3. Accordingly, action segment output module 420 adds segments 604 and 605 to the collection of consecutive segments corresponding to the target action sequence starting with segments 601-603.

Once action segment output module 420 determines that a given segment corresponds to the background Phase 0 after identifying all the consecutive segments along the path that correspond to the action Phases 1-3, action segment output module 420 stops adding segments to the collection of consecutive segments. The action segment output module 420 stores or outputs the given collection of consecutive segments as a first instance of segments that correspond to the selected target action sequence. The action segment output module 420 continues processing the segments sequentially until it finds the next collection of segments that start with the first action Phase 1 and end with the last action Phase 3 to provide a second instance of segments that correspond to the selected target action sequence.

At operation 706, the action segment detection system 124 generates a display of the video that includes the set of consecutive video segments and skips other video segments in the video. For example, the client device 102 receives the identification of the segments that are included in the collection of segments corresponding to the target action sequence. This identification may be in the form of segment identifiers or time codes representing the play positions of the start and end of each instance of segments that correspond to a selected target action sequence. The client device 102 may then automatically display and playback the selected video to the user starting from the first segment in the collection that corresponds to the selected target action sequence and ending with the last segment in the collection. The client device 102 may omit or skip over any background segments or segments that do not correspond to the selected target action sequence.

In some embodiments, the action segment detection system 124 trains the machine learning techniques by alternately updating the segment feature extraction module 416 and the action phase filter module 418. For example, the maximal path $\mathcal{P}_c^*$ in Equation 5 is initially discovered based on the output of the current phase filters $\{f(\bullet, w_c^j, b_c^j)\}_{j=1}^M$. Then, the path score of the detected maximal path $F_c(\mathcal{P}_c^*)$ and the video's ground-truth class label $y_c \in \{0, 1\}$ are used to compute the classification loss $\mathcal{L}_c$. Through back-propagation, the weights of the phase filter module 418 and the segment feature extraction module 416 are updated. This process is described below in connection with process 800.

At operation 801, the action segment detection system 124 receives training videos and corresponding ground-truth labels. For example, action segment detection system 124 receives training videos 403. These videos include ground-truth labels that identify each segment in the video as corresponding to a particular action phase and/or that identify the maximal action phase transition path along the segments of the videos.

At operation 802, the action segment detection system 124 initializes phase filter weights for each action class and associated action phases. For example, the parameters of each phase for each class $w_c^j$, $b_c^j$ of segment feature extraction module 416 and action phase filter module 418 are initialized to a random number.

At operation 803, the action segment detection system 124 generates a set of segments for a selected one of the training videos and a set of features for each segment. For example, the segment generation module 412 selects a given training video from training videos 403 and uniformly generates equal length segments by dividing the video equally in time. This generates the segments for a given video: $V_k \rightarrow [s_{k,1}, \ldots, s_{k,N}]$. The segments are provided to the segment feature extraction module 416 to provide a set of features $x_{k,i} \leftarrow g(s_{k,i}, W)$ for the segments of the given training video that has been selected.

At operation 804, the action segment detection system 124 detects an action phase transition path that is associated with a sum of action phase confidence scores having a maximum value. For example, action phase filter module 418 and action segment output module 420 process the set of features for the segments of the selected training video using process 800 to identify the path $\mathcal{P}_{k,c}^*$ through the segments that results in the maximum overall action phase confidence scores.

At operation 805, the action segment detection system 124 computes a loss value of the detected action phase transition path relative to the ground-truth action phase transition path. For example, the loss computation module 440 retrieves the ground-truth maximal path for the selected training video and computes the loss value relative to the detected action phase transition path in accordance with Equation 6:

$$\mathcal{L}_c = y_c \log(\tanh(F_c(\mathcal{P}_c^*) + \varepsilon) - (1 - y_c) \log(1 - \tanh(f_c(\mathcal{P}_c^*))) \quad (6)$$

At operation 806, the action segment detection system 124 computes loss values for each segment and its associated action phase confidence score relative to the ground-truth labels. For example, the loss computation module 440 retrieves the ground-truth labels of action phases for each segment of the selected training video and computes the loss value relative to the action phase confidence score computed for the segment action in accordance with Equations 7-9:

$$\frac{\partial \mathcal{L}_c}{\partial w_c^j} = \frac{\partial \mathcal{L}_c}{\partial F_c(\mathcal{P}_{k,c}^*)} \sum_{i=1}^{N} \mathbb{1}(p_i = j) \frac{\partial v_{i,c}^j}{\partial w_c^{p_i}} = \frac{\partial \mathcal{L}_c}{\partial F_c(\mathcal{P}_{k,c}^*)} \sum_{i=1}^{N} \mathbb{1}(p_i = j) x_i \quad (7)$$

$$\frac{\partial \mathcal{L}_c}{\partial b_c^j} = \frac{\partial \mathcal{L}_c}{\partial F_c(\mathcal{P}_{k,c}^*)} \sum_{i=1}^{N} \mathbb{1}(p_i = j) \frac{\partial v_{i,c}^j}{\partial b_c^{p_i}} = \frac{\partial \mathcal{L}_c}{\partial F_c(\mathcal{P}_{k,c}^*)} \sum_{i=1}^{N} \mathbb{1}(p_i = j) \quad (8)$$

$$\frac{\partial \mathcal{L}_c}{\partial x_{k,i}} = \frac{\partial \mathcal{L}_c}{\partial F_c(\mathcal{P}_{k,c}^*)} \sum_{i=1}^{N} \mathbb{1}(p_i = j) \frac{\partial v_{i,c}^j}{\partial x_{k,i}} = \frac{\partial \mathcal{L}_c}{\partial F_c(\mathcal{P}_{k,c}^*)} w_c^{p_i} \quad (9)$$

At operation 807, the action segment detection system 124 updates the phase filter weights for the given class. This may be performed based on the computed loss values provided by loss computation module 440 in accordance with Equation 10:

$$w_c^j \leftarrow w_c^j - \delta \frac{\partial \mathcal{L}_c}{\partial w_c^j}, \quad b_c^j \leftarrow b_c^j - \delta \frac{\partial \mathcal{L}_c}{\partial b_c^j} \quad (10)$$

At operation 808, the action segment detection system 124 updates weights used to generate the set of features. This may be performed based on the computed loss values provided by loss computation module 440 in accordance with Equations 11-12:

$$\frac{\partial \mathcal{L}_c}{\partial vec(W)} = \sum_{c=1}^{C} \sum_{i=1}^{N} \left[\frac{\partial g(s_i, W)}{\partial vec(W)}\right]^T \frac{\partial \mathcal{L}_c}{\partial x_i} \quad (11)$$

$$W \leftarrow W - \delta \frac{\partial \mathcal{L}_c}{\partial W} \quad (12)$$

Below is illustrative pseudo-code for performing the process 800 of alternately updating the weights and parameters of the machine learning techniques of action segment detection system 124. Algorithm 2 is discussed below in connection with process 900:

| Algorithm I Alternately Updating |
|---|
| Input: Videos $\{V_k\}_{k=1}^K$ and the their ground-truth labels $\{y_k \in \{0, 1\}^C\}_{k=1}^K$, total epoch number T, initialized weights of backbone network W, learning rate $\delta$ |
| Output: Weights of the phase-filters $\{w_c^j, b_c^j\}_{j=1, c=1}^{M,C}$ |
| 1:     for c = 1 to C do |
| 2:         for j = 1 to M do |
| 3:             initialize $w_c^j, b_c^j$ |
| 4:     for k = 1 to K do |
| 5:         $V_k \rightarrow [s_{k,1}, \ldots, s_{k,N}]$ |
| 6:     for t = 1 to T do |
| 7:         for k = 1 to K do |
| 8:             $x_{k,i} \leftarrow g(s_{k,i}, W)$ |
| 9:             for c = 1 to C do |
| 10:                 discover $\mathcal{P}_{k,c}^*$, based on Algorithm 2 |
| 11:                 compute $\mathcal{L}_c$ |
| 12:                 for j = 1 to M do |
| 13:                     compute $\frac{\partial \mathcal{L}_c}{\partial w_c^j}$ and $\frac{\partial \mathcal{L}_c}{\partial b_c^j}$ |
| 14:                     $w_c^j \leftarrow w_c^j - \delta \frac{\partial \mathcal{L}_c}{\partial w_c^j}, b_c^j \leftarrow b_c^j - \delta \frac{\partial \mathcal{L}_c}{\partial b_c^j}$ |
| 15:                 for i = 1 to M do |
| 16:                     compute $\frac{\partial \mathcal{L}_c}{\partial x_{k,i}}$ |
| 17:                 compute $\frac{\partial \mathcal{L}_c}{\partial W}$ |
| 18:                 $W \leftarrow W - \delta \frac{\partial \mathcal{L}_c}{\partial W}$ |
| 19:     return $\{w_c^j\}_{j=1, c=1}^{M,C}$. |

In order to compute the maximal path, the action segment output module 420 defines the action phases in accordance with Equation 13:

$$p_{i-1} \in \{(p_i + M) \% (M+1), p_i\} \quad (13)$$

$S_{c,i}^j$ is defined as the maximal score of all possible paths starting from segment $s_1$ and ending in segment $s_i$ with phase j for class c. Equation 14 defines the overall confidence score for a given class and phase as:

$$S_{c,i}^j = \max\{S_{c,i-1}^j, S_{c,i-1}^{j\uparrow}\} + v_{c,i}^j,$$

where
$j \uparrow = (j = M) \% (M+1)$,
$F_c(\mathcal{P}_c^*)$ can be obtained through $$F_c(\mathcal{P}_c^*) = \max_{j \in [\theta, M]} S_{c,N}^j. \quad (14)$$

At operation 901, the action segment detection system 124 receives features of a sequence of video segments, an action class selection, and phase filter weights. For example, the action segment detection system 124 receives the features $[x_1, \ldots, x_N]$ for a given video which may be a training video. The action segment detection system 124 receives the action class c which may be specified by a user or the action class associated with a selected training video. The action segment detection system 124 receives the phase filter weights $\{w_c^j, b_c^j\}_{j=1}^M$.

At operation 902, the action segment detection system 124 computes action phase confidence score for each phase of the action class for the first video segment in the sequence using the received phase filter weights. For example, the action phase filter module 418 computes the first column of table 600 using the received phase filter weights for each action phase of the first video segment of the video using Equation 1: $S_{c,1}^j \leftarrow v_{c,1}^j$.

At operation 903, the action segment detection system 124 selects a next adjacent video segment in the sequence.

At operation 904, the action segment detection system 124 compares the action phase confidence score of the previous video segment for the current phase with the action phase confidence score of the previous video segment for the next allowable action phase. For example, the action segment output module 420 processes table 600 to identify the computed action phase confidence score of a previous video segment. The action segment output module 420 uses the phase transition rule to determine two allowable phases to which the previous action phase is allowed to transition to using Equations 2 and 13. The action segment output module 420 obtains the computed phase confidence score for the two phases of the previous video segment. For example, the the action segment output module 420 determines $S_{c,i-1}^j > S_{c,i-1}^{j\uparrow}$.

At operation 905, the action segment detection system 124 computes the action phase confidence score for the current phase of the action class for the current video segment. For example, the action phase filter module 418 computes a next column of table 600 using the received phase filter weights for each action phase of the next video segment of the video using Equation 1: $v_{c,i}^j$.

At operation 906, the action segment detection system 124 aggregates into the confidence score for the current video segment and the current phase the computed action phase confidence score for the current phase and action phase confidence score of the previous video segment for the current phase or for the next allowable action phase based on the comparison. For example, in response to determining that $S_{c,i-1}^j > S_{c,i-1}^{j\uparrow}$, the action segment output module 420 computes $S_{c,i}^j \leftarrow S_{c,i-1}^j + v_{c,i}^j$, $P_i^j \leftarrow j$ for the current phase and current segment. Otherwise, in response to determining that $S_{c,i-1}^j > S_{c,i-1}^{j\uparrow}$ is not true, the action segment output module 420 computes $S_{c,i}^j \leftarrow S_{c,i-1}^{j\uparrow} + v_{c,i}^j$, $P_i^j \leftarrow j\uparrow$ for the current phase and current segment. After processing all the segments for all the phases of the video, the $S_{c,i}^j$ represents the maximal score of all the possible action phase transition paths in table 600.

At operation 907, the action segment detection system 124 identifies the maximum computed action phase confidence scores and path transition across all the phases and all the segments. For example, the action segment output module 420 identifies the maximum overall action phase confidence scores in accordance with $F_c(\mathcal{P}_c^*) \leftarrow \max_{j \in [0,M]} S_{c,N}^j$ and the path in accordance with $p_N \leftarrow \operatorname{argmax}_{j \in [0,M]} S_{c,N}^j$.

Below is illustrative pseudo-code for performing the process 900 of identifying the maximal path using action segment detection system 124.

---

Algorithm 2 Maximal Path Discovery

Input: The segments features $[x_1, \ldots, x_N]$, an action type c and weights of phase filters $\{w_c^j, b_c^j\}_{j=1}^M$,
Output: The maximal path $\mathcal{P}_c^* = [p_1, \ldots, p_N]$. The path score of maximal path $F_c(\mathcal{P}_c^*)$.
  1: for j = 0 to M do
     $S_{c,i}^j \leftarrow v_{c,1}^j$
  2: for i = 2 to N do
  3: for j = 0 to M do
  4: if $S_{c,i-1}^j > S_{c,i-1}^{j\uparrow}$ then
  5: $S_{c,i}^j \leftarrow S_{c,i-1}^j + v_{c,i}^j$, $P_i^j \leftarrow j$
  6: else
  7: $S_{c,i}^j \leftarrow S_{c,i-1}^{j\uparrow} + v_{c,i}^j$, $P_i^j \leftarrow j$
  8: $F_c(\mathcal{P}_c^*) \leftarrow \max_{j \in [0,M]} S_{c,N}^j$
  9: $p_N \leftarrow \operatorname{argmax}_{j \in [0,M]} S_{c,N}^j$
 10: for i = N − 1 to 1 do
 11: $p_i \leftarrow P_{i+1}^{P_{i+1}}$
 12: return $\mathcal{P}_c^*$ and $F_c(\mathcal{P}_c^*)$

---

In some embodiments, the maximal path is identified by iterating through all the combinations of all the possible paths across the action phases for each segment. For example, the action segment output module 420 first accesses the set of action phase confidence scores for a first segment. The action segment output module 420 selects the maximum value among the set of action phase confidence scores for the first segment and identifies the action phase (e.g., Phase 1) corresponding to the maximum value. The action segment output module 420 then uses the action phase transition rule to determine the pair of possible action phases to which the first segment can transition. Namely, the action segment output module 420 may determine that from Phase 1 the first segment can transition to Phase 1 of the second segment or Phase 2 of the second segment but not Phase 3 or Phase 0. Accordingly, the action segment output module 420 determines between Phase 1 and Phase 2 of the second segment the maximum action phase confidence score. The action segment output module 420 selects the maximum action phase confidence score of the second segment (e.g., the score corresponding to Phase 1) and accumulates this value with the value previous selected for the first segment. Next, the action segment output module 420 analyzes the pair of phases to which the second segment can transition to the third segment (e.g., Phase 1 or Phase 2). The action segment output module 420 retrieves the values of the two Phases 1 and 2 of the third segment and selects the maximum of the two values with which the running accumulated value is accumulated. This process continues until the last segment of the table 600 is reached.

In some embodiments, the action segment output module 420 repeats the process to compute a path score for another path in which the second highest confidence score is selected for the phase of the next segment. For example, rather than selecting Phase 1 for the second segment, the action segment output module 420 selects Phase 2 and accumulates the score of Phase 2 with the confidence value of the first segment. This process may be repeated across all the combinations of all possible paths to produce a total set of all possible path scores. The action segment output module 420 may then identify the maximum path score among all the possible paths and the corresponding path to identify the segments corresponding to a selected target action sequence.

In some embodiments, a soft-max path discovery is implemented by action segment output module 420. Using the soft-max path discovering the maximum confidence score is selected only by its soft counterpart in accordance with Equation 15:

$$S_{c,i}^j \leftarrow \max^\alpha \left( S_{c,i-1}^j, S_{c,i-1}^{j\dagger} \right) + v_{c,i}^j, \quad (15)$$

where $\max^\alpha (\cdot)$ is soft-max operator define as : $\max^\alpha (x, y) = \log(e^{\alpha x} + e^{\alpha y})/\alpha$.

in which $\alpha$ is a positive constant controlling the softness. By default $\alpha$ may be set to 10 and the soft-max path discovery is computed in accordance with Equation 16:

$$\overline{F}_c(\mathcal{P}_c^*) = \log\left(\sum_{j=0}^M e^{\alpha S_{c,N}^j}\right) / \alpha \quad (16)$$

and back propagation is computed in accordance with Equation 17:

$$\frac{\partial \mathcal{L}_c}{\partial w_c^j} = \frac{\partial \mathcal{L}_c}{\partial \overline{F}_c(\mathcal{P}_c^*)} \sum_{j=0}^M \frac{e^{\alpha S_{c,N}^j}}{\sum_{j'=1}^N e^{\alpha S_{c,N}^{j'}}} \frac{\partial S_{c,N}^j}{\partial w_c^j}, \quad (17)$$

Under this circumstance, when back-propagating gradient, it counts multiple paths into consideration and assigns different weights according to their importance. In some embodiments, the soft-max path discovery is performed only in training and the maximum path discovery is performed when applying the trained system to a new video received from a client device 102.

Below is illustrative pseudo-code for identifying the soft-max path using action segment detection system 124.

---
Algorithm Soft-max Path Discovery

---
Input: The segments' features [$x_1$, ..., $x_N$], an action type c and weights of the phase filters $\{w_c^j, b_c^j\}_{j=1}^M$,
Output: The path score of soft path $\overline{F}_c(\mathcal{P}_c^*)$,
1: for j = 0 to M do
    $S_{c,1}^j \leftarrow v_{c,1}^j$
2: for i = 2 to N do
3:    for j = 0 to M do
        $S_{c,i}^j \leftarrow \max^\alpha (S_{c,i-1}^j, S_{c,i-1}^{j-1}) + v_{c,i}^j$
4: $\overline{F}_c(\mathcal{P}_c^*) \leftarrow \log(\Sigma_{j=0}^M e^{\alpha S_{c,N}^j})/\alpha$
5: return $\overline{F}_c(\mathcal{P}_c^*)$.

---

Figure 10:
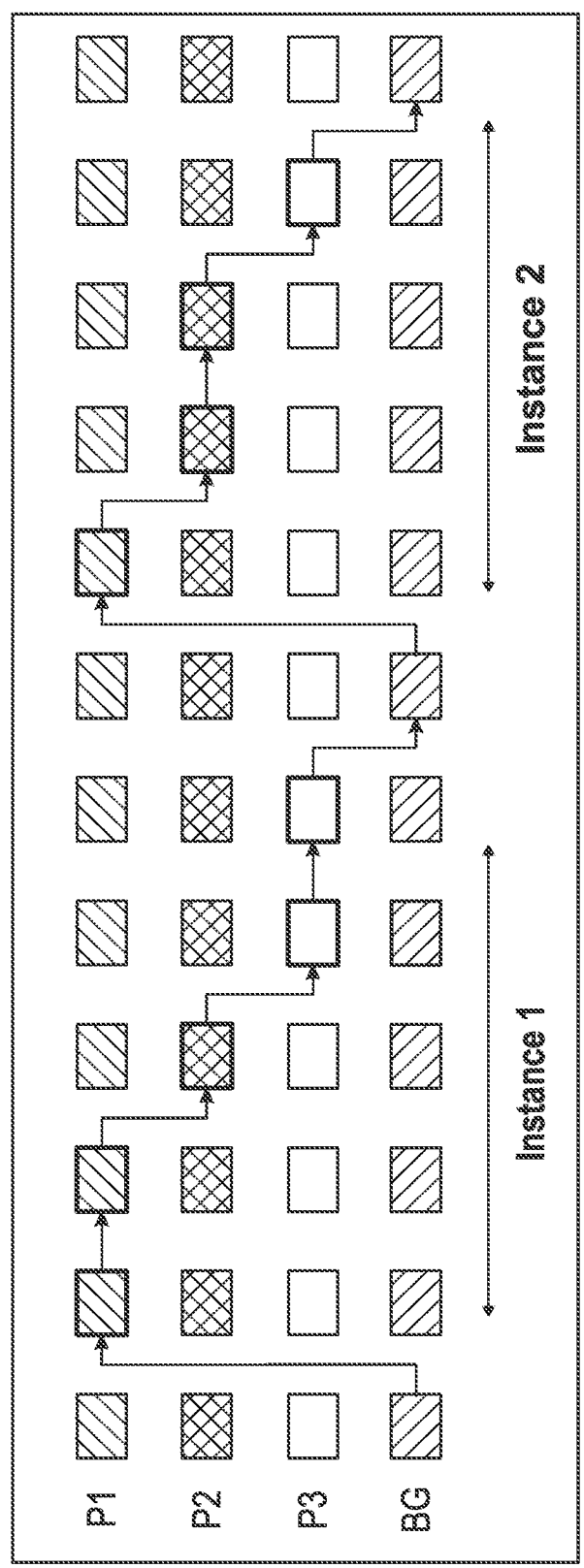
FIG. 10 is an illustrative outputs of the action segment detection system, according to example embodiments.

FIG. 10 provides example outputs of the action segment detection system 124. As shown, a given path through the segments begins with the first segment being assigned the background Phase 0 followed by a second segment being assigned to Phase 1 of the action sequence. The second segment transitions to Phase 1 of the third segment followed by Phase 2 of the fourth segment, then Phase 3 of the fifth segment and Phase 3 of the sixth segment. The path then returns back to the background Phase 0 for the seventh segment. The action segment detection system 124 detects that a first instance of a target action sequence begins with the second segment in Phase 1 and ends with the sixth segment in Phase 3 just before the seventh segment which is assigned to the background Phase 0. Following the seventh segment, another instances of the target action sequence is identified with a different path through Phases but that still follows the phase transition rule where Phase 1 can only transition to Phase 1 or Phase 2 of the following segment but not Phase 3 or Phase 0. These identified instances are provided to client device 102 for playback of the selected action sequence of a given video only and skipping the segments corresponding to the background Phase 0.

Figure 11:
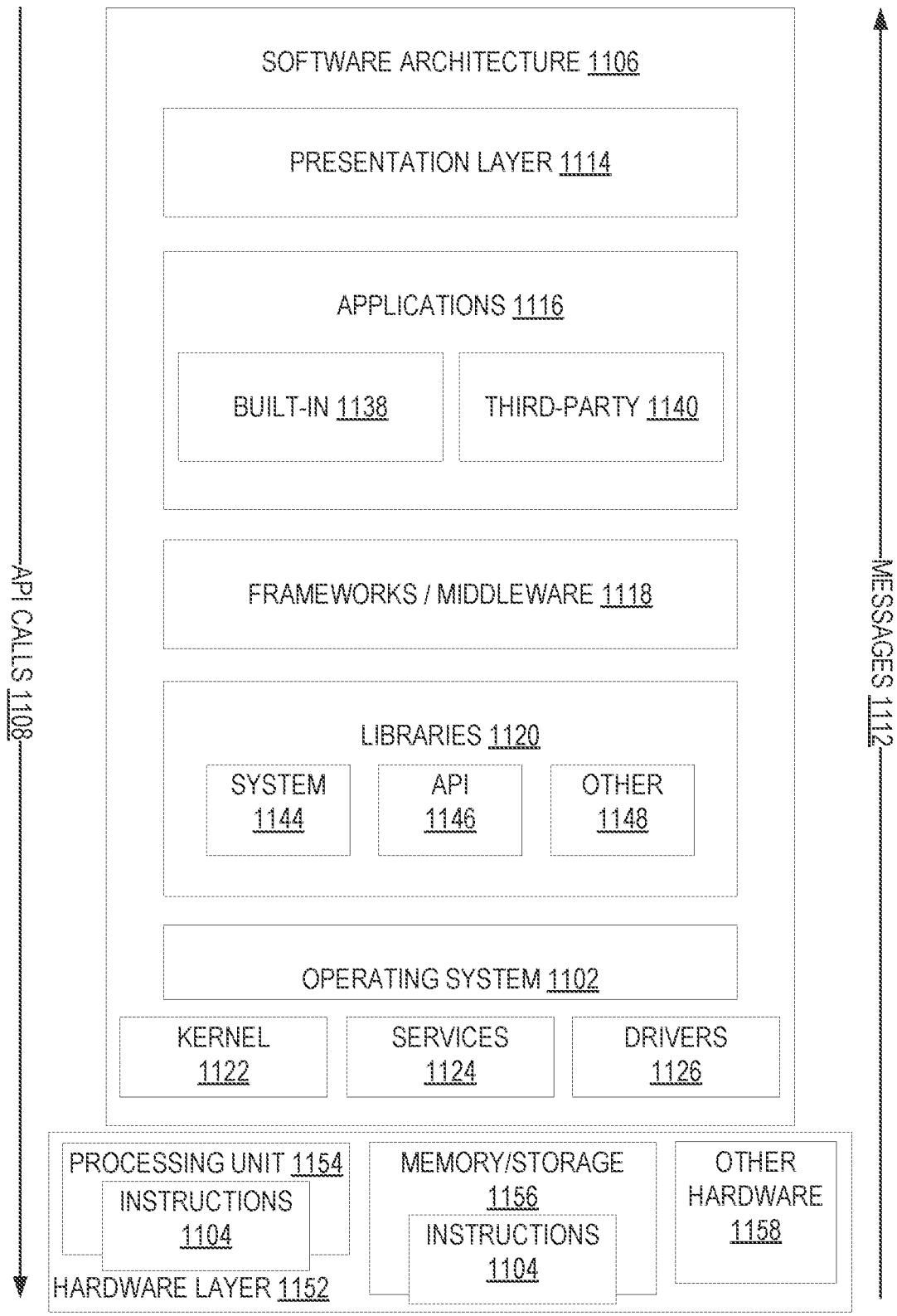
FIG. 11 is a block diagram illustrating a representative software architecture, which may be used in conjunction with various hardware architectures herein described, according to example embodiments.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as machine 1100 of FIG. 11 that includes, among other things, processors 1204, memory 1214, and input/output (I/O) components 1218. A representative hardware layer 1152 is illustrated and can represent, for example, the machine 1200 of FIG. 12. The representative hardware layer 1152 includes a processing unit 1154 having associated executable instructions 1104. Executable instructions 1104 represent the executable instructions of the software architecture 1106, including implementation of the methods, components, and so forth described herein. The hardware layer 1152 also includes memory and/or storage modules memory/storage 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, frameworks/middleware 1118, applications 1116, and a presentation layer 1114. Operationally, the applications 1116 and/or other components within the layers may invoke API calls 1108 through the software stack and receive messages 1112 in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124, and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphic UI (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built-in operating system functions (e.g., kernel 1122, services 1124, and/or drivers 1126), libraries 1120, and frameworks/middleware 1118 to create UIs to interact with users of the system. Alternatively, or additionally, in some systems, interactions with a user may occur through a presentation layer, such as presentation layer 1114. In these systems, the application/component "logic" can be separated from the aspects of the application/component that interact with a user.

Figure 12:
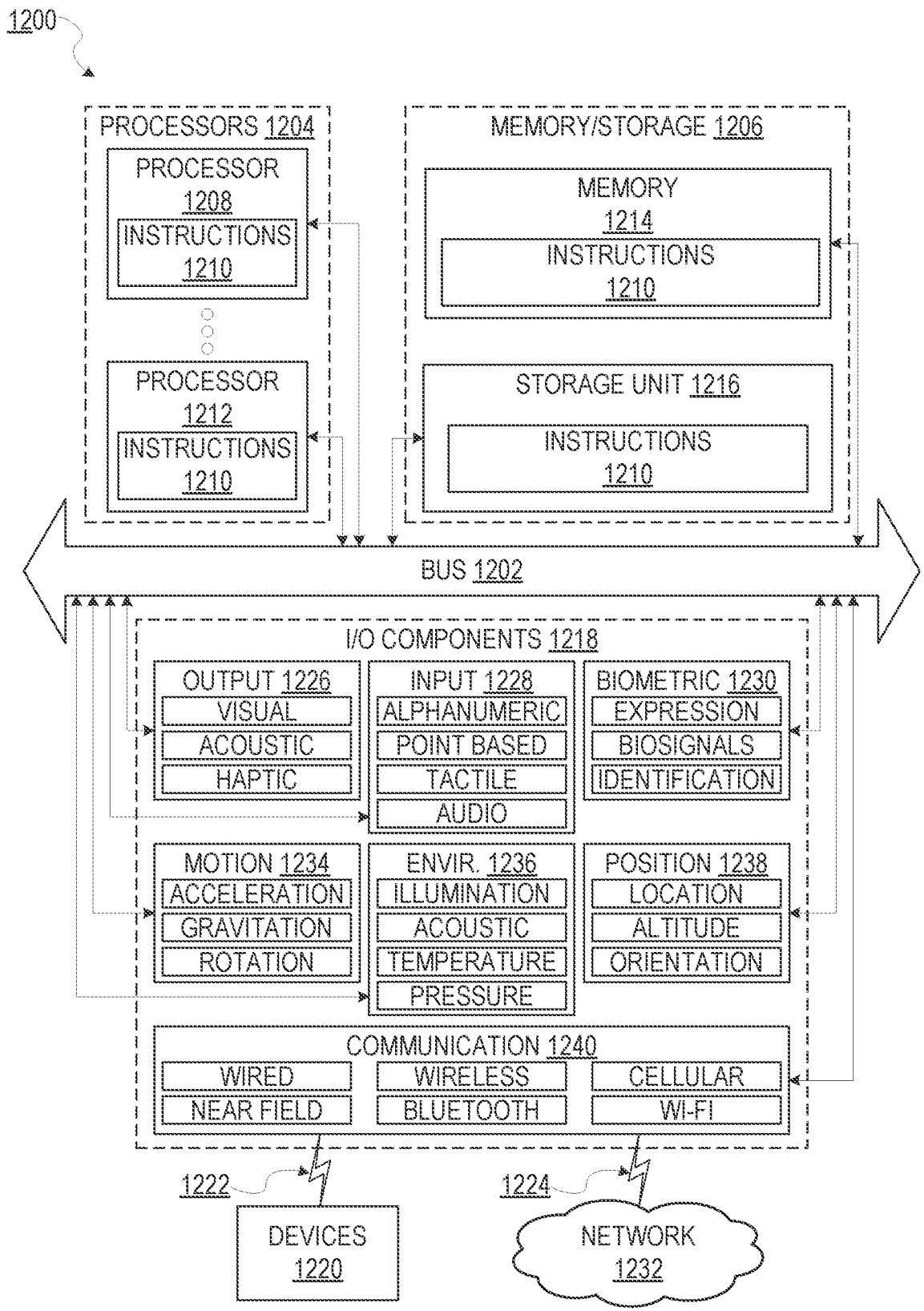
FIG. 12 is a block diagram illustrating components of a machine able to read instructions from a machine-readable medium (e.g., a machine-readable storage medium) and perform any one or more of the methodologies discussed herein, according to example embodiments.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory/storage 1206, and I/O components 1218, which may be configured to communicate with each other such as via a bus 1202. In an example embodiment, the processors 1204 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1208 and a processor 1212 that may execute the instructions 1210. The term "processor" is intended to include multi-core processors 1204 that may comprise two or more independent processors (sometimes referred to as "cores") that may execute instructions contemporaneously. Although FIG. 12 shows multiple processors 1204, the machine 1200 may include a single processor with a single core, a single processor with multiple cores (e.g., a multi-core processor), multiple processors with a single core, multiple processors with multiple cores, or any combination thereof.

The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environmental components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1224 and coupling 1222, respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
receiving training videos and corresponding ground-truth labels comprising ground-truth action phase transition paths; and
training a machine learning model to estimate an action phase transition path for a given video by performing training operations comprising:
initializing phase filter weights of the machine learning model for each action class of a plurality of action classes and associated action phases of each action class;
generating a set of segments for a selected one of the training videos and a set of features for each of the set of segments; and
for each of the plurality of action classes and for the selected one of the training videos:
applying the machine learning model to the selected one of the training videos to detect an action phase transition path that is associated with a sum of action phase confidence scores having a maximum value;
computing a first loss as a function of the detected action phase transition path and the ground-truth action phase transition path of the selected one of the training videos;
computing a second loss as a function of each segment of the set of segments and associated action phase confidence score relative to the ground-truth labels; and
updating parameters of the machine learning model comprising the phase filter weights based on the first loss and the second loss.

2. The method of claim 1, further comprising updating weights used to generate the set of features for each of the set of segments based on a third loss that is a function of the set of features and ground-truth features associated with the selected one of the training videos.

3. The method of claim 1, wherein the ground-truth labels identify each segment of each video in the training videos as corresponding to a particular action phase.

4. The method of claim 3, wherein the ground-truth labels identify a maximal action phase transition path along the segments of each training video.

5. The method of claim 1, wherein initializing the phase filter weights comprises setting the phase filter weights to a random number.

6. The method of claim 1, wherein generating the set of segments for the selected one of the training videos comprises uniformly generating equal length segments by dividing the selected one of the training videos equally in time.

7. The method of claim 1, wherein detecting the action phase transition path comprises:
computing, for each of the set of segments, a plurality of action phase confidence scores indicating a likelihood that a given segment includes a respective action phase of a sequence of action phases associated with a given one of the plurality of action classes;
retrieving a first action phase confidence score of the plurality of action phase confidence scores, the first action phase confidence score being retrieved for a first segment of the set of segments, the first action phase confidence score being associated with a first action phase of the sequence of action phases;
retrieving a second action phase confidence score of the plurality of action phase confidence scores, the second action phase confidence score being retrieved for a second segment of the set of video segments, second action phase confidence score being associated with the first action phase, the second video segment being sequentially adjacent to the first video segment;
retrieving a third action phase confidence score of the plurality of action phase confidence scores, third action phase confidence score being retrieved for the second segment, the third action phase confidence score being associated with a second action phase of the sequence of action phases, the second action phase being sequentially adjacent to the first action phase in the sequence of action phases; and
in response to determining that the third action phase confidence score is greater than the second action phase confidence score, computing an action phase transition path score based on the first action phase confidence score for the first segment and the third action phase confidence score for the second segment.

8. The method of claim 7, further comprising generating a parameter that represents a maximal score of all possible action phase transition paths associated with the given one of the plurality of action classes.

9. The method of claim 7, further comprising:
computing, for each of the set of segments, a second plurality of action phase confidence scores indicating a likelihood that the given segment includes a respective action phase of a second sequence of action phases associated with a second one of the plurality of action classes;
retrieving a fourth action phase confidence score of the second plurality of action phase confidence scores, the fourth action phase confidence score being retrieved for the first segment of the set of segments, the fourth action phase confidence score being associated with a first action phase of the second sequence of action phases;
retrieving a fifth action phase confidence score of the second plurality of action phase confidence scores, the fifth action phase confidence score being retrieved for the second segment of the set of video segments, fifth action phase confidence score being associated with the first action phase of the second sequence of action phases;
retrieving a sixth action phase confidence score of the second plurality of action phase confidence scores, sixth action phase confidence score being retrieved for the second segment, the sixth action phase confidence score being associated with a second action phase of the second sequence of action phases; and
in response to determining that the sixth action phase confidence score is greater than the fifth action phase confidence score, computing a second action phase transition path score based on the fourth action phase confidence score and the sixth action phase confidence score.

10. The method of claim 1 further comprising:
applying a first machine learning technique to the set of segments to generate the features.

11. The method of claim 10, wherein the phase filter weights are associated with a plurality of phase filters, each associated with a different action phase of the action phases.

12. The method of claim 11, wherein the plurality of phase filters are applied using a second machine learning technique.

13. The method of claim 12 further comprising training the first machine learning technique and the second machine learning technique sequentially, wherein the second machine learning technique is trained before the first machine learning technique.

14. The method of claim 1, further comprising:
determining, based on a rule, a set of action phases to which a given action phase is allowed to transition.

15. A system comprising:
a processor configured to perform operations comprising:
receiving training videos and corresponding ground-truth labels comprising ground-truth action phase transition paths; and
training a machine learning model to estimate an action phase transition path for a given video by performing training operations comprising:
initializing phase filter weights of the machine learning model for each action class of a plurality of action classes and associated action phases of each action class;
generating a set of segments for a selected one of the training videos and a set of features for each of the set of segments; and
for each of the plurality of action classes and for the selected one of the training videos:
applying the machine learning model to the selected one of the training videos to detect an action phase transition path that is associated with a sum of action phase confidence scores having a maximum value;
computing a first loss as a function of the detected action phase transition path and the ground-truth action phase transition path of the selected one of the training videos;
computing a second loss as a function of each segment of the set of segments and associated action phase confidence score relative to the ground-truth labels; and
updating parameters of the machine learning model comprising the phase filter weights based on the first loss and the second loss.

16. The system of claim 15, wherein the operations further comprise:
generating first and second action phase confidence scores for a second segment of the set of segments that is sequentially adjacent to a first segment of the set of segments, the first segment being associated with a third action phase confidence score for a first action phase of the associated action phases, the first action phase confidence score being associated with the first action phase and the second action phase confidence score being associated with a second action phase of the associated action phases; and
selecting the first action phase confidence score instead of the second action phase confidence score associated with the second segment for computing an action phase transition path score comprising the third action phase confidence score associated with the first segment in response to determining that the first action phase confidence score is greater than the second action phase confidence score.

17. The system of claim 15, wherein the ground-truth labels identify each segment of each video in the training videos as corresponding to a particular action phase.

18. The system of claim 17, wherein the ground-truth labels identify a maximal action phase transition path along the segments of each training video.

19. The system of claim 15, wherein initializing the phase filter weights comprises setting the phase filter weights to a random number.

20. A non-transitory machine-readable storage medium that includes instructions that, when executed by one or more processors of a machine, cause the machine to perform operations comprising:
receiving training videos and corresponding ground-truth labels comprising ground-truth action phase transition paths; and
training a machine learning model to estimate an action phase transition path for a given video by performing training operations comprising:
initializing phase filter weights of the machine learning model for each action class of a plurality of action classes and associated action phases of each action class;
generating a set of segments for a selected one of the training videos and a set of features for each of the set of segments; and for each of the plurality of action classes and for the selected one of the training videos:
applying the machine learning model to the selected one of the training videos to detect an action phase transition path that is associated with a sum of action phase confidence scores having a maximum value;
computing a first loss as a function of the detected action phase transition path and the ground-truth action phase transition path of the selected one of the training videos;
computing a second loss as a function of each segment of the set of segments and associated action phase confidence score relative to the ground-truth labels; and
updating parameters of the machine learning model comprising the phase filter weights based on the first loss and the second loss.

\* \* \* \* \*